(12) United States Patent
Hao et al.

(10) Patent No.: US 11,281,422 B2
(45) Date of Patent: Mar. 22, 2022

(54) VIDEO DATA DISPLAY METHOD AND DEVICE

(71) Applicant: NEW H3C CLOUD TECHNOLOGIES CO., LTD., Chengdu (CN)

(72) Inventors: Lei Hao, Beijing (CN); Yonggang Zeng, Beijing (CN)

(73) Assignee: NEW H3C CLOUD TECHNOLOGIES CO., LTD., Chengdu (CN)

(*) Notice: Subject to any disclaimer, the term of this patent is extended or adjusted under 35 U.S.C. 154(b) by 0 days.

(21) Appl. No.: 16/627,552

(22) PCT Filed: May 23, 2018

(86) PCT No.: PCT/CN2018/087997
§ 371 (c)(1),
(2) Date: Dec. 30, 2019

(87) PCT Pub. No.: WO2019/007161
PCT Pub. Date: Jan. 10, 2019

(65) Prior Publication Data
US 2020/0218491 A1    Jul. 9, 2020

(30) Foreign Application Priority Data

Jul. 6, 2017   (CN) .......................... 201710545950.6

(51) Int. Cl.
*G09G 5/00* (2006.01)
*G06F 3/14* (2006.01)
(Continued)

(52) U.S. Cl.
CPC .......... *G06F 3/1454* (2013.01); *G06F 3/1462* (2013.01); *H04N 21/4316* (2013.01);
(Continued)

(58) Field of Classification Search
CPC ...... G06F 3/1454; G06F 3/1462; G06F 9/452; G09G 5/14; G09G 2340/02;
(Continued)

(56) References Cited

U.S. PATENT DOCUMENTS

2009/0106662 A1    4/2009  Ye et al.
2010/0106798 A1*   4/2010  Barreto ................. G06F 16/957
                                                           709/217
(Continued)

FOREIGN PATENT DOCUMENTS

CN    101547351    9/2009
CN    103069425    4/2013
(Continued)

OTHER PUBLICATIONS

International Search Report and Written Opinion issued in corresponding International Patent Application No. PCT/CN2018/087997, dated Aug. 1, 2018 (English Translation of Search Report Only).
(Continued)

*Primary Examiner* — Adam J Snyder
(74) *Attorney, Agent, or Firm* — Norton Rose Fulbright US LLP

(57) ABSTRACT

A method and a device of displaying video data are provided. The method includes receiving playing-window filling data sent from a server, determining player information, playing window information and a data channel identifier based on the playing-window filling data, displaying a player interface corresponding to the player information at a client, determining the playing window corresponding to the playing window information based on the player interface, and displaying the video data corresponding to the data channel identifier in the playing window. The technical solutions of the present disclosure ensure that the player
(Continued)

interface synchronizes with the playing window for video data, so that the client may correctly display the video data and the user experience may be improved.

12 Claims, 10 Drawing Sheets

(51) Int. Cl.
  *H04N 21/431* (2011.01)
  *H04N 21/44* (2011.01)
  *H04N 21/462* (2011.01)
  *H04N 21/466* (2011.01)
  *G09G 5/14* (2006.01)
  *G06F 9/451* (2018.01)
  *H04N 21/435* (2011.01)
  *H04N 21/485* (2011.01)

(52) U.S. Cl.
  CPC ..... *H04N 21/44008* (2013.01); *H04N 21/466* (2013.01); *H04N 21/4622* (2013.01); *G06F 9/452* (2018.02); *G09G 5/14* (2013.01); *G09G 2340/02* (2013.01); *G09G 2340/125* (2013.01); *G09G 2370/20* (2013.01); *H04N 21/435* (2013.01); *H04N 21/4312* (2013.01); *H04N 21/4858* (2013.01)

(58) Field of Classification Search
  CPC ......... G09G 2340/125; G09G 2370/20; H04N 21/4312; H04N 21/4316; H04N 21/435; H04N 21/44008; H04N 21/4622; H04N 21/466; H04N 21/4858
  See application file for complete search history.

(56) References Cited

U.S. PATENT DOCUMENTS

| | | | |
|---|---|---|---|
| 2010/0268828 | A1 | 10/2010 | Pahlaven et al. |
| 2012/0096397 | A1 | 4/2012 | Ording et al. |
| 2013/0263045 | A1* | 10/2013 | Minematsu ........... G06F 3/0481 |
| | | | 715/788 |
| 2014/0359003 | A1 | 12/2014 | Sullad et al. |
| 2016/0198208 | A1* | 7/2016 | Gao ................. H04N 21/47202 |
| | | | 725/116 |

FOREIGN PATENT DOCUMENTS

| | | |
|---|---|---|
| CN | 103414867 | 11/2013 |
| CN | 103428538 | 12/2013 |
| CN | 104040995 | 9/2014 |
| CN | 104301742 | 1/2015 |
| CN | 104869457 | 8/2015 |
| CN | 106572361 | 4/2017 |
| EP | 2120157 | 11/2009 |
| JP | 2002133212 | 5/2002 |
| JP | 2009205492 | 9/2009 |
| JP | 2013206442 | 10/2013 |
| KR | 20140117889 | 10/2014 |

OTHER PUBLICATIONS

Extended European Search Report issued in Corresponding European Application No. 18829066.2, dated Apr. 21, 2020 (10 pages).
Cranor et al., "Enhanced Streaming Services in a Content Distribution Network" *IEEE Internet Computing* 2001, 66-75.
Office Action issued in Corresponding Japanese Application No. 2019-572610, dated Mar. 23, 2021 (English Translation provided).

* cited by examiner

VIDEO DATA DISPLAY METHOD AND DEVICE

CROSS-REFERENCE TO RELATED APPLICATIONS

The present application is a national phase under 35 U.S.C. § 371 of International Application No. PCT/CN2018/087997, filed May 23, 2018, which claims priority to Chinese Patent Application No. CN201710545950.6, entitled "Video Data Display Method and Device" and filed with China National Intellectual Property Administration on Jul. 6, 2017, each of which are incorporated herein by reference in their entirety.

TECHNICAL FIELD

The present disclosure relates to the technical field of communication, and particularly to a method and a device for displaying video data.

BACKGROUND

As the computer technology and the network technology develop, remote desktop technology has been more widely used in enterprise office environments. Remote desktop technology can lower the cost of information management for enterprises and improve the security of data access. Wherein the principle behind remote desktop technology is to send the content displayed on the screen of one device (i.e. a server providing virtualization service, server for short in the present disclosure) to a device on the other side (a thin client for processing a remote protocol, client for short in the present disclosure) via network for display.

Video data playing is a typical application of remote desktop. The server acquires coded video data, decodes the video data and sends the decoded video data to a client which will display the decoded video data via a player. It is found by studies that such method of displaying video data remains to be improved in its display performance.

SUMMARY

Embodiments of the present disclosure provide a method of displaying video data, which is applied to the client for remote display in multimedia redirection. The method includes the steps of: receiving the playing-window filling data sent from the server and determining the player information, the playing window information and the data channel identifier based on the playing-window filling data;

displaying, by the client, a player interface corresponding to the player information;

determining a playing window corresponding to the playing window information based on the player interface; and displaying the video data corresponding to the data channel identifier in the playing window.

Optionally, the step of determining the player information, the playing window information and the data channel identifier based on the playing-window filling data specifically includes the sub-steps of:

parsing out the player information, the playing window information and the data channel identifier from the playing-window filling data, if the playing-window filling data includes the player information, the playing window information and the data channel identifier; or, parsing out the player information and the image identification code from the playing-window filling data, if the playing-window filling data includes the player information and an image identification code and the image identification code includes the data channel identifier; displaying the image identification code in the player interface corresponding to the playing window information, determining the playing window information based on the area where the image identification code is displayed, and parsing out the data channel identifier from the image identification code.

Optionally, the sub-step of parsing out the data channel identifier from the image identification code specifically includes:

converting, starting from the left of the image identification code, the image identification code into a numeric character string by an image identification technology, wherein the image identification code consists of one data channel identifier image; or converting, starting from the center of the image identification code, the image identification code into a numeric character string by the image identification technology, wherein the image identification code consists of two data channel identifier images which are bilaterally symmetrical, with the data channel identifier image being an image corresponding to a numeric character string consisting of a first identifier, a data channel identifier and a second identifier; and parsing out, from the numeric character string obtained by the converting, a first character string matching with the first identifier and a second character string matching with the second identifier, and determining a character string between the first character string and the second character string as the data channel identifier.

Optionally, the method further includes:

sending operation information regarding an operation a user performs on the player interface to the server, so that the server learns upon receiving the operation information that there is a change in the dimensions and/or coordinates of a virtual player interface corresponding to the player interface, so as to regenerate playing-window filling data based on the data channel identifier, the changed player information and playing window information with the data channel identifier for assigning a data channel for the video data to the client, and to send it to the client.

Embodiments of the present disclosure provide a method of displaying video data, which is applied to the server in multimedia redirection. The method includes the steps of: assigning a data channel for the video data to the client, wherein the video data is sent to the client via the data channel and the data channel is uniquely determined by a data channel identifier;

acquiring the player information and the playing window information of the player for playing the video data;

generating playing-window filling data based on the player information, the playing window information and the data channel identifier; and sending the playing-window filling data to the client, so that the client displays the video data according to the player information, the playing window information and the data channel identifier.

Optionally, the step of generating playing-window filling data based on the player information, the playing window information and the data channel identifier specifically includes the sub-steps of:

generating an image identification code including the data channel identifier, and displaying the image identification code according to the playing window information; generating playing-window filling data according to the interface where the image identification code is displayed, wherein the playing-window filling data includes the player information and the image identification code; or generating playing-window filling data carrying the player information, the playing window information and the data channel identifier.

Optionally, the sub-step of generating an image identification code including the data channel identifier specifically includes:

adding a first identifier before the data channel identifier and a second identifier behind the data channel identifier, organizing the first identifier, the data channel identifier and the second identifier to form a numeric character string, and converting the numeric character string into a data channel identifier image of an image format by an image conversion technology; and generating the image identification code using the data channel identifier image, wherein the image identification code consists of one data channel identifier image or two data channel identifier images which are bilaterally symmetrical.

Optionally, the step of generating playing-window filling data based on the player information, the playing window information and the data channel identifier specifically includes:

generating playing-window filling data based on the player information, the playing window information and the data channel identifier when detecting change in the playing window information corresponding to the video data.

Optionally, the method further includes:

receiving operation information regarding an operation a user performs on the player interface, with the operation information sent from the client, and learning upon receiving the operation information that there is a change in the dimensions and/or coordinates of a virtual player interface corresponding to the player interface, so as to regenerate playing-window filling data based on the data channel identifier for assigning a data channel for the video data to the client, the changed player information and playing window information and send it to the client.

Optionally, the playing-window filling data is carried by a remote desktop protocol message and sent to the client via a remote desktop protocol.

Embodiments of the present disclosure further provide a device of displaying video data, which is applied to the client for remote display in multimedia redirection. The device includes a receiving module which is configured to receive the playing-window filling data sent from the server, a determination module which is configured to determine the player information, the playing window information and the data channel identifier based on the playing-window filling data, and a display module which is configured to display by the client the player interface corresponding to the player information. The determination module is further configured to determine the playing window corresponding to the playing window information based on the player interface. The display module is further configured to display the video data corresponding to the data channel identifier in the playing window.

Embodiments of the present disclosure further provide a device of displaying video data, which is applied to the server in multimedia redirection. The device includes an assigning module which is configured to assign a data channel for video data to the client, the video data being sent to the client via the data channel and the data channel being uniquely determined by a data channel identifier, an acquisition module which is configured to acquire the player information and the playing window information of the player for playing the video data, a generation module which is configured to generate playing-window filling data based on the player information, the playing window information and the data channel identifier, and a sending module which is configured to send the playing window-filling data to the client so that the client may display the video data based on the player information, the playing window information and the data channel identifier.

Optionally, the generation module is specifically configured to generate an image identification code including the data channel identifier, in the process of generating playing-window filling data based on the player information, the playing window information and the data channel identifier, display the image identification code according to the playing window information, and then generate playing-window filling data based on the interface where the image identification code is displayed, with the playing-window filling data including the player information and the image identification code; or generate playing-window filling data carrying the player information, the playing window information and the data channel identifier.

Optionally, the generation module is further configured to, in the process of generating an image identification code including the data channel identifier, add a first identifier before the data channel identifier and a second identifier behind the data channel identifier, organize the first identifier, the data channel identifier and the second identifier to form a numeric character string, and convert the numeric character string into a data channel identifier image of an image format by an image conversion technology; and generate an image identification code using the data channel identifier image, wherein the image identification code consists of one data channel identifier image or two bilaterally-symmetrical data channel identifier images.

Optionally, the generation module is specifically configured to, in generating playing-window filling data based on the player information, the playing window information and the data channel identifier, generate playing-window filling data based on the playing information, the playing window information and the data channel identifier when detecting change in the playing window information corresponding to the video data.

Optionally, the acquisition module is further configured to receive operation information regarding an operation a user performs on the player interface with the operation information sent from the client, and learn that there is a change in the dimensions and/or coordinates of a virtual player interface corresponding to the player interface upon receiving such operation information. The generation module is further configured to regenerate playing-window filling data based on the data channel identifier, the changed player information and playing window information, with the data channel identifier for assigning a data channel for the video data to the client. The sending module is further configured to send the regenerated playing-window filling data to the client.

According to the above technical solutions, in the present disclosure, the server sends playing-window filling data to the client, and the client may determine the player information, the playing window information and the data channel identifier based on the playing-window filling data, display by the client the player interface corresponding to the player information, determine the playing window corresponding to the playing window information based on the player interface, and display the video data corresponding to the data channel identifier in the playing window. The above methods can facilitate that the player interface synchronizes with the playing window for the video data, so that the client may correctly display the video data, e.g. the video data changing with the player location in real time, and thereby the display performance and the user experience may be improved.

BRIEF DESCRIPTION OF DRAWINGS

To more clearly illustrate the technical solutions of the present disclosure or in the prior art, drawings necessary for description of the present disclosure or the prior art will be briefly described below. Obviously, the drawings described below are merely some embodiments recorded in the present disclosure. Those ordinarily skilled in the art may obtain further drawings according to these drawings of the present disclosure.

DETAILED DESCRIPTION OF EMBODIMENTS

A common process for playing video data based on a remote desktop includes: first acquiring, by a server, coded video data; decoding the video data and sending the decoded video data to a client; and the client displaying the decoded video data by a player. It is found by studies that such method of displaying video data remains to be improved in its display performance. For example, displaying video data in the above manner requires the server to decode the video data, which occupies massive CPU (Central Processing Unit) resources. Besides, the video data would have a large data volume once decoded. Quite a network bandwidth is required to transmit such video data.

Targeting the above problem, an MMR (Multimedia Redirection) technology is available. By the MMR technology, once the server acquires the coded video data, the coded video data is directly sent to the client which will decode the video data as received, and the decoded video data will be displayed by a player. With the MMR technology, the server is not required to decode the coded video data, and thereby the CPU resources of the server may be saved. The data volume of the coded video data is far less than that of the decoded video data, hence the network bandwidth may be saved. However, using the MMR technology may lead to incorrect video data displaying when the client displays the decoded video data by a player. For example, the video data failing to change with the player location in real time may lead to poor display performance and poor user experience.

The terms used in the present disclosure are merely for describing specific embodiments, rather than limiting the present disclosure. The singular forms "a", "an" and "the" used in the embodiments and the claims of the present disclosure are intended to include plural referents unless the context clearly dictates otherwise. It is also appreciated that the term "and/or" refers to any or all possible combinations of one or more associated items as listed.

It is appreciated that terms like "first", "second" and "third" may be used to describe various information in the present disclosure, but such information should not be limited to such terms. These terms are used only to distinct information of the same type from each other. For example, first information may also be referred to as second information, and similarly, second information may also be referred to as first information, without departing from the scope of the present disclosure. Depending on the context, in addition, the word "if" as used herein may be interpreted as "when" or "while" or "a response to a determination".

Figure 1A:
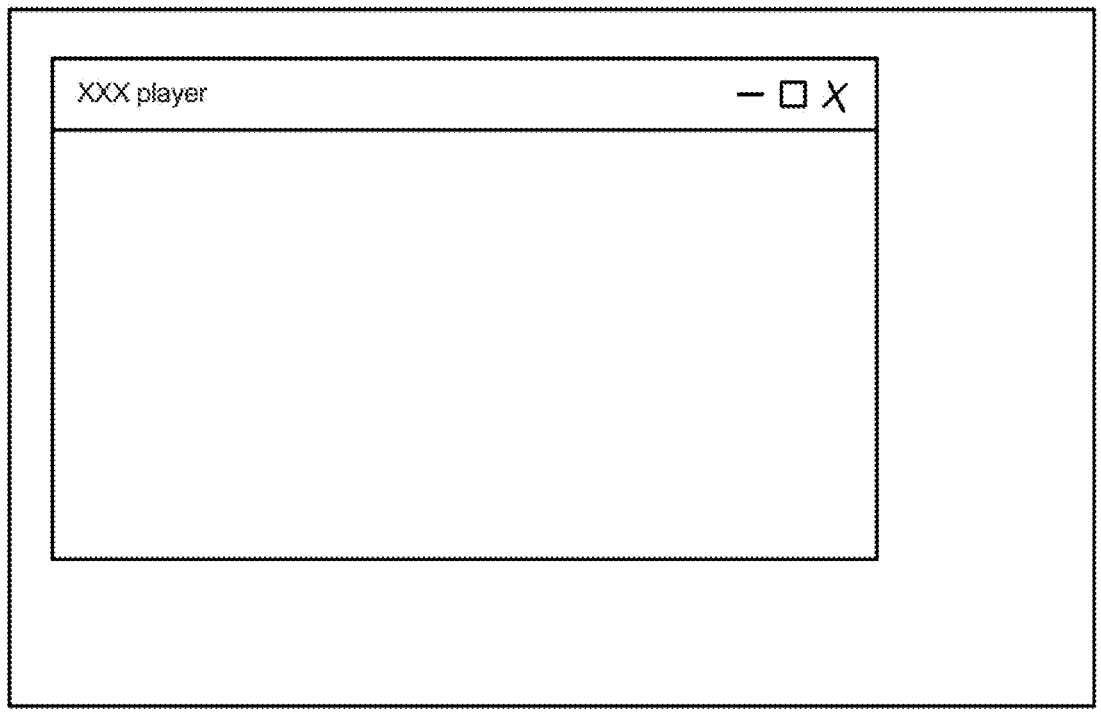
FIGS. 1A-1J are schematic diagrams of application scenarios according to an example of the present disclosure.
Figure 1B:
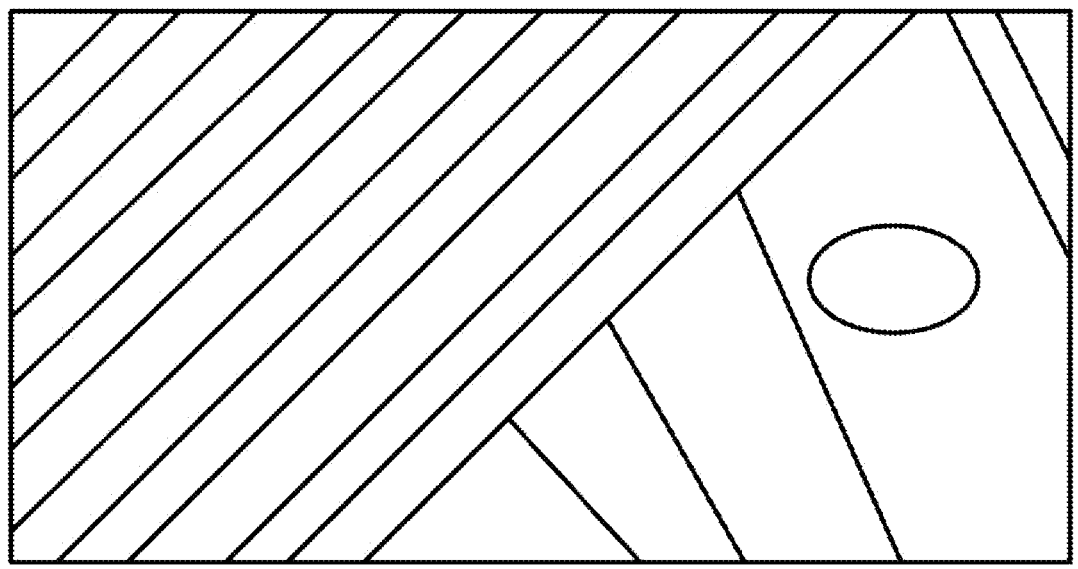
Figure 1C:
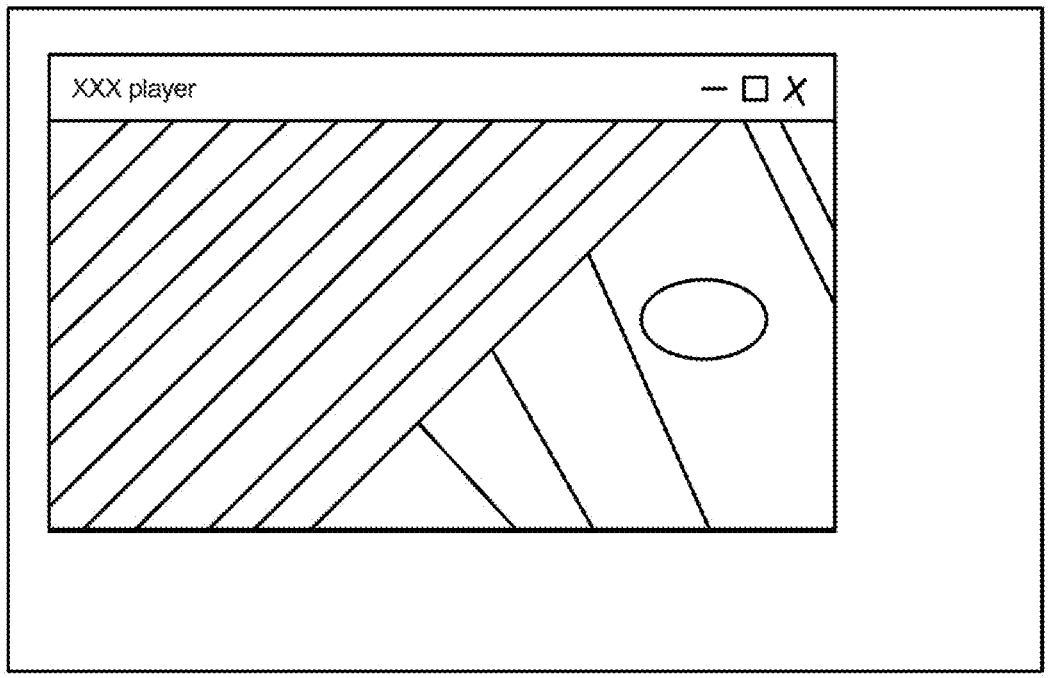

In an example, the process of playing the video data of the server may include: opening locally the player by the server, and displaying the player interface as shown in FIG. 1A which is a schematic diagram of the player interface; then acquiring and decoding, by the server, the coded video data, which gives decoded video data, as shown in FIG. 1B; and then displaying, by the server, the decoded video data, i.e. the schematic diagram shown in FIG. 1C.

If remote desktop technology is required to play video data, the server does not display the decoded video data on the local player interface, instead, it sends the video data (coded video data or decoded video data) to a client which will display the decoded video data on a player interface local to the client. In such an application scenario, the server does not display the real player interface, but simulate a virtual player interface for remote display. This virtual player interface is identical with the one shown in FIG. 1A, except that the virtual player interface is simulated in the memory, but is not really displayed from the display. In the meanwhile, the client will actually display the player interface on the local display. This player interface is totally identical with the virtual one simulated by the server. In this way, remote desktop technology is realized.

If remote desktop technology is required to play video data, for enabling the client to correctly display the video data (as shown in FIG. 1C), the server transmits to the client the following information.

I. Player information, such as player interface information and player location information, to which no limitation is made in the present disclosure. Based on such player information, a player interface corresponding to the player information may be displayed. As shown in FIG. 1A, it is an example of the player interface displayed based on certain player information.

Wherein the player interface information may include but not limited to the information related to the player interface, e.g. the model of the player interface, etc., to which no limitation is made, and in addition to such tabs as "xxx player", "minimizing identifier -", "maximizing identifier ☐", "deletion identifier x", etc., it may also include one or more of "fast forward key", "volume (sound) key", "fast backward key", "progress bar key", "pause key", "stop key" and "full screen key", etc. which are not shown in FIG. 1A.

Wherein the player location information may include player interface dimensions and player coordinates, etc. For example, the player interface dimensions may include e.g. length w1 and height h1, etc. The player coordinates (x1, y1) may be the coordinates of the upper left corner, the lower left corner, the upper right corner, the lower right corner and the central point, etc.

Figure 1D:
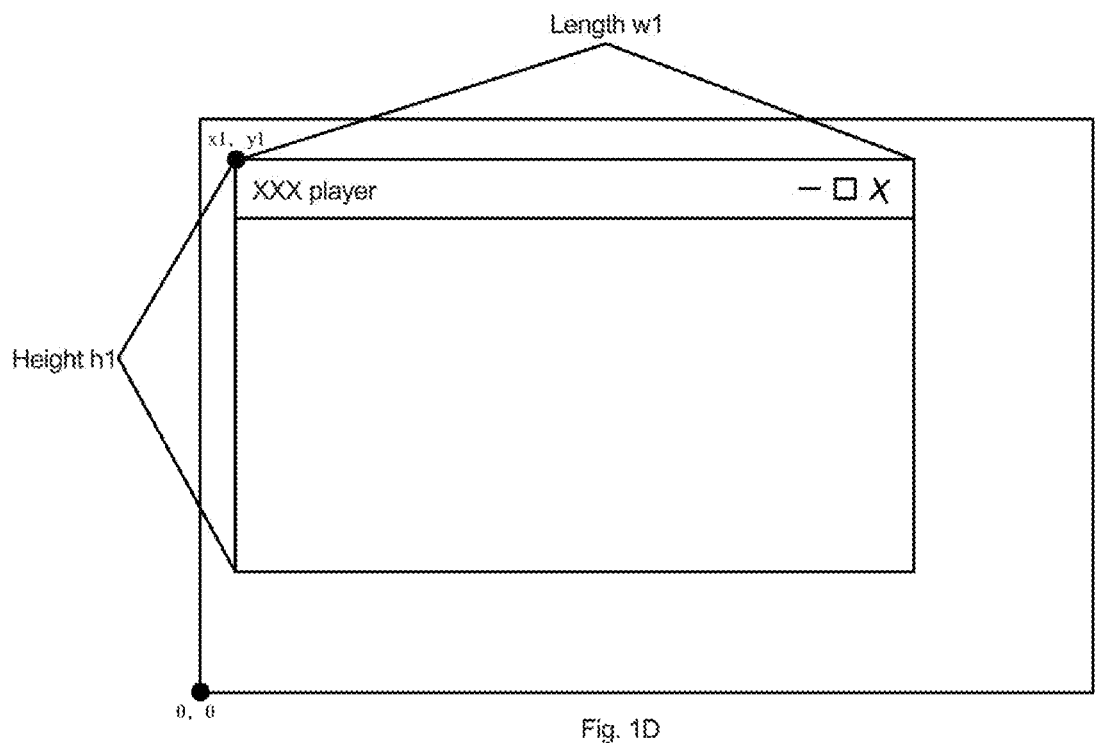

As shown in FIG. 1D, once the upper left corner coordinates (x1, y1) are determined, the player interface in FIG. 1A may be obtained based on the known length w1 and height h1. The upper left corner coordinates (x1, y1) are those with respect to the origin of coordinates (0, 0), wherein the origin of coordinates (0, 0) may be the lower left corner of the screen, and no limitation is made to the origin of coordinates (0, 0) herein. For example, the origin of coordinates (0, 0) may also be the upper left corner, the center, the upper right corner and the lower right corner of the screen, etc. Similarly, the player interface in FIG. 1A may also be obtained once the lower left corner coordinates, the upper right corner coordinates, the lower right corner coordinates and the central point coordinates are determined, which will not be repeated here.

II. Video data, i.e. the video data to be displayed on the player, which may be video images, video frames and so on, and to which no limitation is made, as shown in FIG. 1B which is an example of video data.

III. Playing window information for the video data, e.g. playing window dimensions and playing window coordinates. For example, the playing window dimensions may include e.g. length w2 and height h2, and the playing window coordinates (x2, y2) may be the coordinates of the upper left corner, the lower left corner, the upper right corner, the lower right corner and the central point, etc.

Figure 1E:
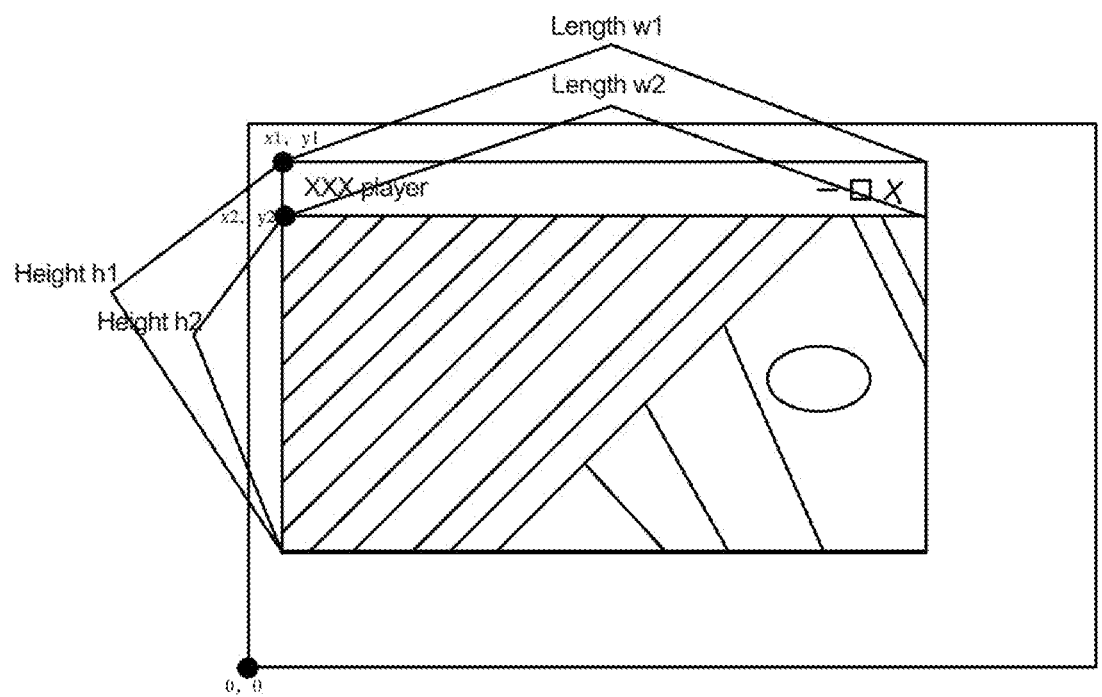

As shown in FIG. 1E, the playing window information includes the upper left corner coordinates (x2, y2), the length w2 and the height h2. The upper left corner coordinates (x2, y2) are those with respect to the origin of coordinates (0, 0). The origin of coordinates (0, 0) may be the lower left corner of the screen and no limitation is made to the origin of coordinates (0, 0). The playing window information may also include the coordinates of the lower left corner, the upper right corner, the lower right corner and the central point, etc., which will not be repeated here.

Wherein based on such playing window information, the playing window of the player interface may be determined, and the video data may be displayed in this playing window, as shown in FIG. 1C which is a schematic diagram of displaying video data in a playing window.

In using MMR technology (i.e. multimedia redirection technology), the server simulates a virtual player interface, acquires coded video data, but does not decode the video data, instead, it sends the coded video data directly to the client which will decode the coded video data. In addition, the server may also send the player information and the playing window information for the video data on the virtual player interface to the client. And the above coded video data, player information and playing window information may be sent from the server to the client via one message or different messages, e.g. three different messages.

After receiving the coded video data, the player information and the playing window information, in order to correctly play the video data (as shown in FIG. 1C), the client will do the following.

Figure 1F:
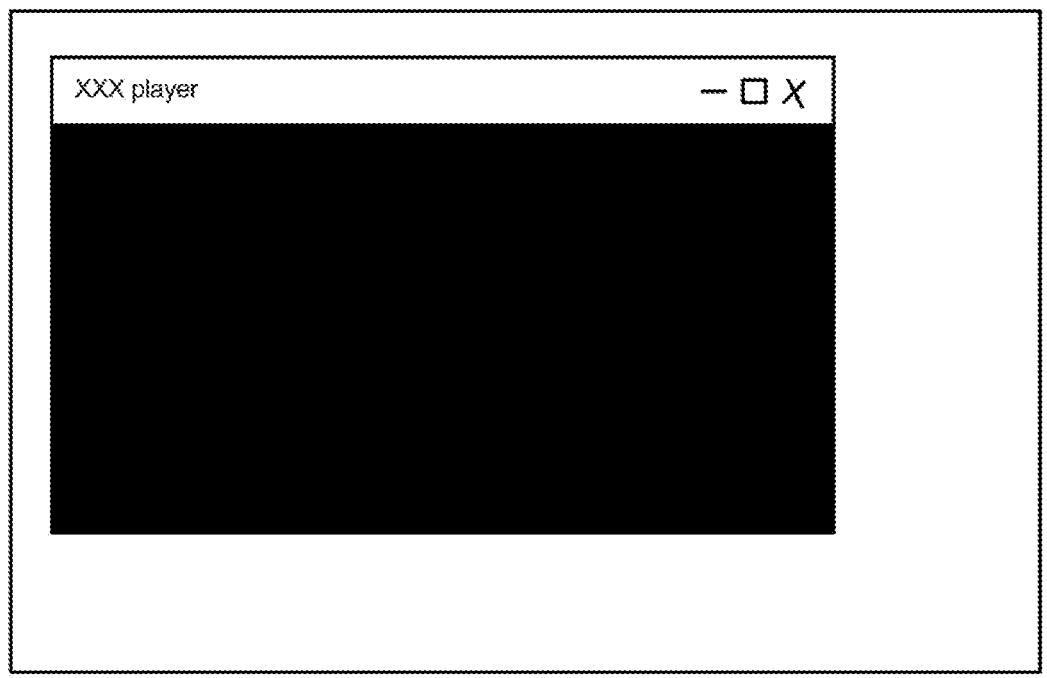

The client displays a player interface based on the player information. Since the player information and the video data are separately transmitted, this player interface is not displaying the real video data currently. In the area (i.e. the playing window) which is supposed to be filled with video data, the client may filled in the area video data of predetermined type (e.g. video data of black images, hereinafter referred to as black screen data), as shown in FIG. 1F. Wherein the video data of predetermined type may also be other video data, e.g. video data of white images, video data of images composed of one or more colors.

After receiving the coded video data, the client decodes the video data, which gives decoded video data, as shown in FIG. 1B. After the playing window information is received, the decoded video data is filled in the black screen area of the player interface based on the playing window information, which gives the schematic diagram as shown in FIG. 1C.

Figure 1G:
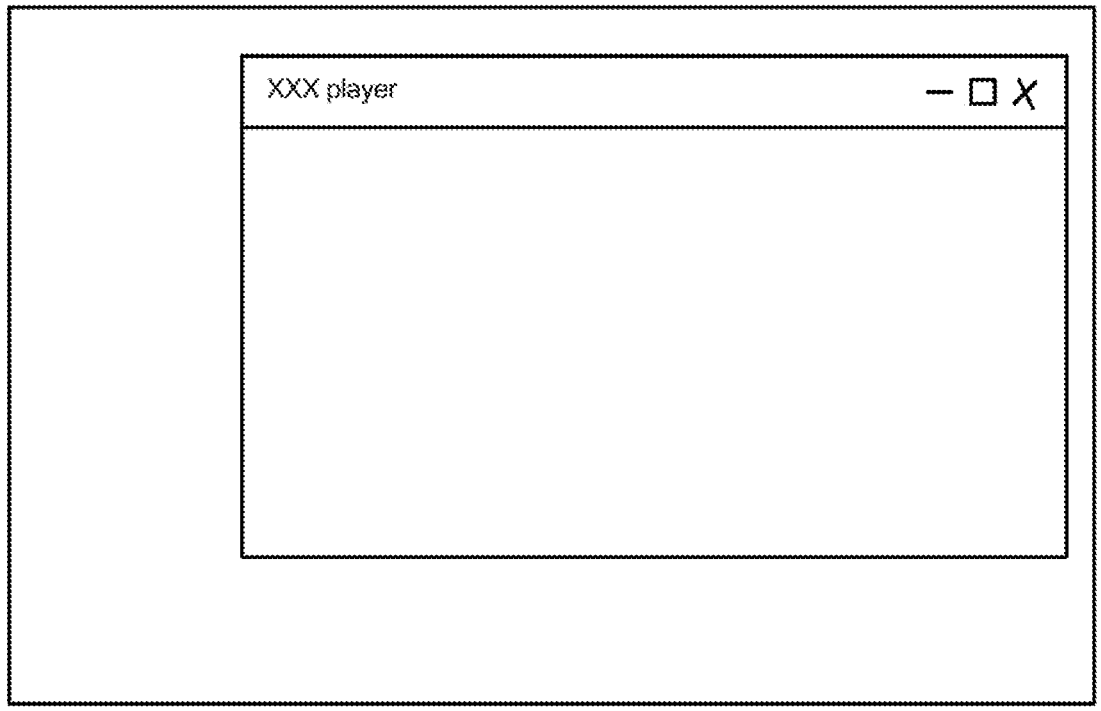
Figure 1H:
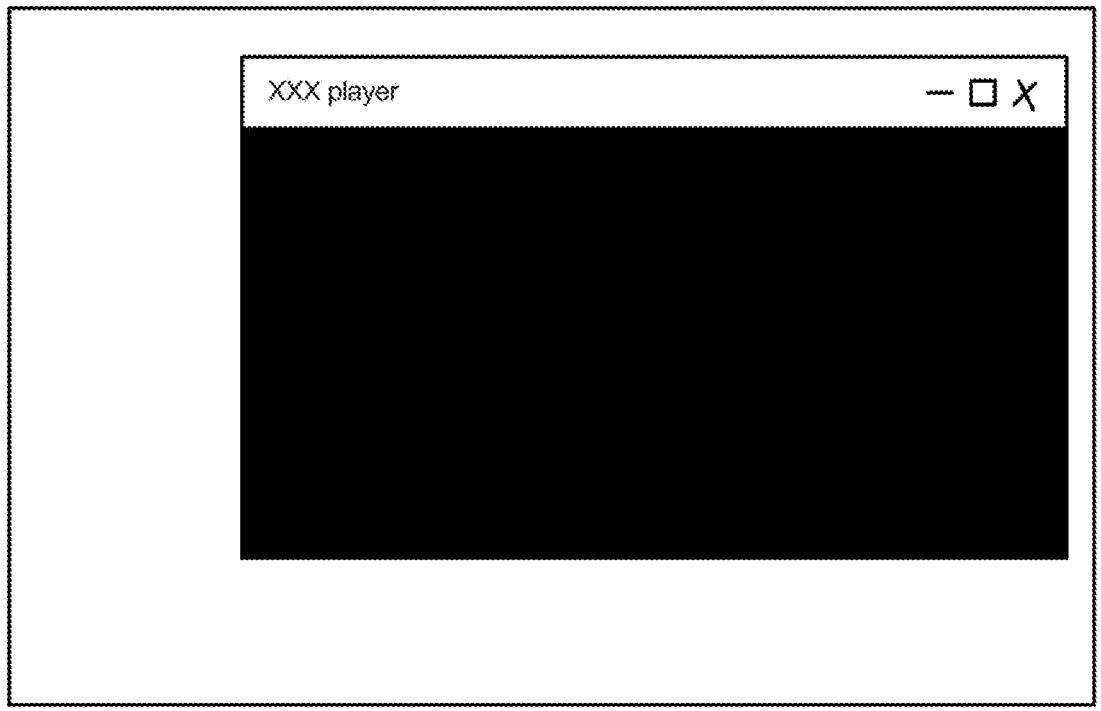
Figure 1I:
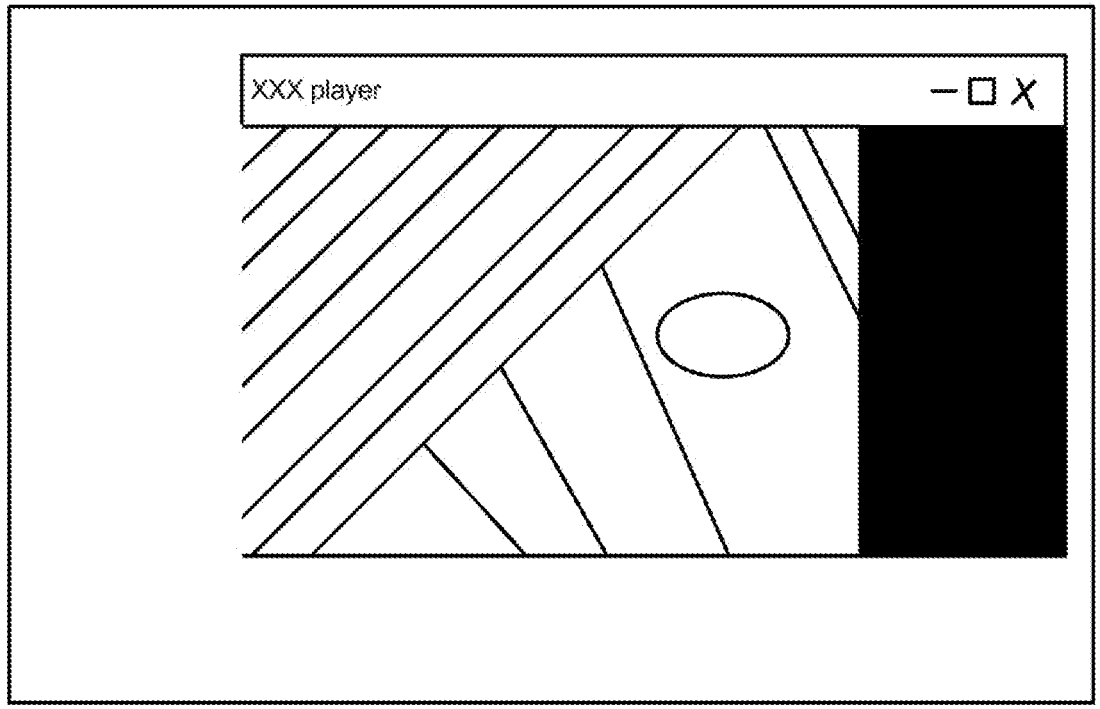

However, in the above manner, if the player interface dimensions change and/or the player coordinates change, the client may not be able to correctly display the video data. Wherein when a user performs stretching or other operations on the player interface, the player interface dimensions (i.e. length w1 and/or height h1) change. When the user drags the player leftwards, rightwards, upwards, downwards or performs other operations, the player coordinates (x1, y1) change. As an example, if the player is translated rightwards, x1 of the player coordinates (x1, y1) changes, as shown in FIG. 1G which is a schematic diagram of the changed player interface.

Wherein the client fails to correctly display the video data because when the player coordinates change, the server sends the changed player information (as shown in FIG. 1G) to the client which will display a player interface as shown in FIG. 1H based on such player information. Compared with FIG. 1F, the overall player interface is translated rightwards. Further, the client fills, based on the playing window information before the change, the decoded video data in the area corresponding to such playing window information, which gives the schematic diagram as shown in FIG. 1I.

Figure 1J:
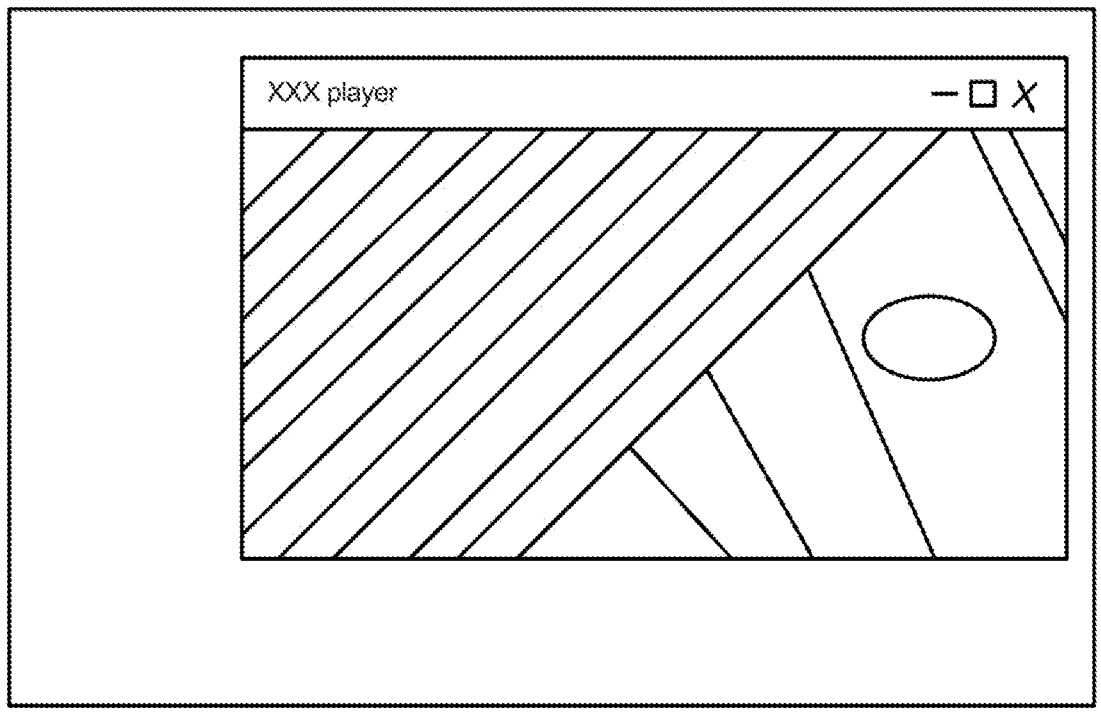

Apparently, the video data is filled in a wrong area, namely, it does not cover the black screen area. It is not until the server sends the changed playing window information to the client that the client may fill the decoded video data in the right area based on the changed playing window information, which gives the schematic diagram as shown in FIG. 1J.

In the above manner, the client cannot obtain the playing window information in real time, leading the video data to failure of changing with the player location in real time, that is to say, the video data lags in a certain way, resulting in poor display performance and poor user experience.

The defects in the above solutions are all found by the inventors through practice and careful studies. Therefore, how the above problems are found and the solutions to the above problems provided by the embodiments of the present disclosure below should all be the inventors' contribution to the present disclosure during disclosure of the present application.

In regard of the above findings, the embodiments of the present disclosure propose a method of displaying video data. The method may be applied to a system including a server and a client, and the server and the client communicate with each other via a remote desktop protocol. Wherein the remote desktop protocol may include, but not limited to, SPICE (Simple Protocol for Independent Computing Environments). In addition, the method of displaying video data is used in a multimedia redirection process (in which the server acquires coded video data but does not decode the video data, instead, it sends the coded video data directly to the client which will decode the coded video data and display the decoded video data on a player interface), and can ensure that the player interface synchronizes with the playing window for the video data by solving the problem that the player interface does not synchronize with the playing window for the video data, which improves user experience.

Figure 2:
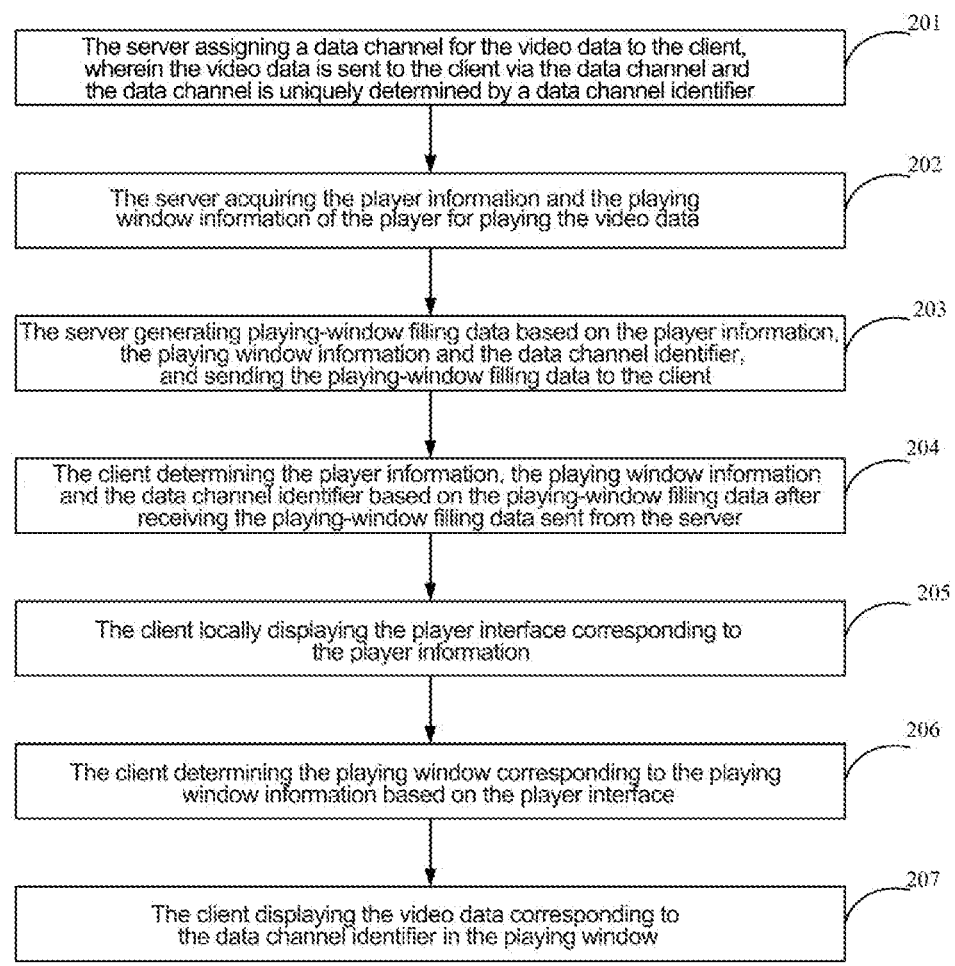
FIG. 2 is a flowchart illustrating a method for displaying video data according to an example of the present disclosure.

As shown in FIG. 2, which is a flow chart of the method of displaying video data, the method may include the following steps.

Block 201, in which the server assigns a data channel for the video data to the client, wherein the video data is sent to the client via the data channel and the data channel is uniquely determined by a data channel identifier.

Wherein several data channels for transmitting video data may be established between the server and the client. Each data channel is corresponding to a unique data identifier. If a data channel is transmitting video data, it means that the data channel is occupied. If the data channel is not transmitting video data, it means the data channel is vacant.

After acquiring the coded video data (the video data to be displayed at the client), the server may assign, from the vacant data channels, a data channel for such video data to the client, send the video data to the client via the data channel, and acquire the data channel identifier corresponding to the data channel. In addition, after receiving the video data via the data channel, the client may also acquire the data channel identifier corresponding to the data channel, i.e. the data channel identifier corresponding to the video data.

Block 202, in which the server acquires the player information and the playing window information of the player for playing the video data (i.e. the playing window information of the playing window for displaying the video data).

In an example, although the server does not display the video data on the interface of the player, the server can know, after acquiring the coded video data, which playing window the video data should be displayed in, and such playing window is the one corresponding to the video data.

For example, the server may open player 1 and player 2 at the same time. Player 1 is corresponding to a virtual player interface 1. There is a playing window 1 on the virtual player interface 1. Assuming video data is to be played in the playing window 1 on virtual player interface 1, the video data for the playing window 1 will be acquired. In this way, it can be known that the playing window corresponding to the video data on the virtual player interface is the playing window 1.

For another example, after the server opens player 1, the player 1 is corresponding to a virtual player interface 1. There are a playing window 1 and a playing window 2 on the virtual player interface 1. Assuming video data is to be played in the playing window 1 on virtual player interface 1, the video data for the playing window 1 will be acquired. In this way, it can be known that the playing window corresponding to the video data on the virtual player interface is the playing window 1.

In an example, after assigning a data channel for video data, the server may acquire the data channel identifier corresponding to the data channel, and acquire the playing window corresponding to the video data on the virtual player interface, and then the server may establish correspondence between the data channel identifier and the playing window.

Block 203, in which the server generates playing-window filling data based on the player information, the playing window information and the data channel identifier, and sends the playing-window filling data to the client.

In an example, the timing for the step where "the server generates playing-window filling data based on the player information, the playing window information and the data channel identifier" may include but not limited to: when change in the playing window information corresponding to the video data is detected, the server may generate playing-window filling data based on the player information, the playing window information and the data channel identifier, and execute the subsequent steps. The playing-window filling data carries the player information, the playing window information and the data channel identifier, so that the client can accurately determine the player information, the playing window information and the data channel identifier simply based on the playing-window filling data, and thereby the client displays the player interface corresponding to the player information locally, and displays the video data corresponding to the data channel identifier in the corresponding playing window, ensuring that the player interface synchronizes with the playing window for the video data, the video data is correctly displayed and the user experience is improved.

Wherein after the client displays the player interface, the user may perform an operation on the player interface. For example, if the user stretches or drags the player interface or performs other operations, the client will send the operation information regarding the operation that the user performs on the player interface via a remote desktop protocol. Upon receiving the operation information regarding the operation that the user performs on the player interface with the operation information sent from the client, the server learns about the change in the dimensions and/or coordinates of the virtual player interface corresponding to the player interface. That is to say, the playing window information displayed on the virtual player interface changes accordingly. In this way, it is possible to detect change in the playing window information and carry out the above steps of generating playing-window filling data, and thereby regenerate playing-window filling data based on the data channel identifier for assigning a data channel for the video data to the client, the changed player information and playing window information and send it to the client.

Wherein the message for carrying the playing-window filling data can be a remote desktop protocol message.

Block 204, in which the client determines the player information, the playing window information and the data channel identifier based on the playing-window filling data after receiving the playing-window filling data sent from the server.

In an example, in the process of generating playing-window filling data based on the player information, the playing window information and the data channel identifier, the server may generate playing-window filling data carrying the player information, the playing window information and the data channel identifier. On this basis, the client may parse out the player information, the playing window information and the data channel identifier directly from the playing-window filling data.

In another example, in the process of generating playing-window filling data based on the player information, the playing window information and the data channel identifier, the server may generate an image identification code including the data channel identifier and display the image identification code according to the playing window information (i.e. display the image identification code on the playing window corresponding to the playing window information), and then generate playing-window filling data according to the interface where the image identification code is displayed, i.e. the playing-window filling data includes the player information and the image identification code. On this basis, the client may parse out the player information and the image identification code from the playing-window filling data, display the image identification code on the player interface corresponding to the player information, determine the playing window information according to the area where the image identification code is displayed, and parse out the data channel identifier from the image identification code.

Wherein as the client can display multiple playing windows and different playing windows are used to display different video data, the client needs to know the correspondence between the playing windows and the video data to display correct video data on the player interface. Further, for enabling the client to know the correspondence between the playing windows and the video data, data channel identifiers may be used to correlate the playing windows with the video data.

It has been described above that the client may determine, after receiving the video data via the data channel, the data channel identifier corresponding to the data channel, i.e. the data channel identifier corresponding to the video data. Therefore, all one has to do is assign a data channel identifier to a playing window, then the client may correlate the playing window with the video data and display the video data in the playing window. To this end, in the present disclosure, the server may generate an image identification code according to the data channel identifier and display the image identification code in the playing window, so that the playing window may be correlated with the video data corresponding to the data channel identifier.

Wherein the step where "the server generates an image identification code including the data channel identifier, and the client parses out the data channel identifier from the image identification code" may include but not limited to the following manners.

Manner 1, the server adds a first identifier before the data channel identifier and a second identifier behind the data channel identifier, organizes the first identifier, the data channel identifier and the second identifier to form a numeric character string, converts the numeric character string into a data channel identifier image of an image format by an image conversion technology, and generates an image identification code using the data channel identifier image, with the image identification code consisting of one data channel identifier image. The client, starting from the left of the image identification code, converts the image identification code (consisting of one data channel identifier image which is an image corresponding to the numeric character string consisting of the first identifier, the data channel identifier and the second identifier) into a numeric character string by an image identification technology, parses out a first character string matching with the first identifier and a second character string matching with the second identifier from the numeric character string obtained by the converting, and determines the character string between the first character string and the second character string, as the data channel identifier.

Manner 2, the server adds a first identifier before the data channel identifier and a second identifier behind the data channel identifier, organizes the first identifier, the data channel identifier and the second identifier to form a numeric character string, converts the numeric character string into a data channel identifier image of an image format by an image conversion technology, and generates an image identification code using the data channel identifier image, with the image identification code consisting of two data channel identifier images which are bilaterally symmetrical. The client, starting from the center of the image identification code, converts the image identification code (consisting of two data channel identifier images which are bilaterally symmetrical, with each data channel identifier image being an image corresponding to a numeric character string consisting of the first identifier, the data channel identifier and the second identifier) into a numeric character string by an image identification technology, parses out a first character string matching with the first identifier and a second character string matching with the second identifier from the numeric character string obtained by the converting, and determines the character string between the first character string and the second character string, as the data channel identifier.

Regarding Manner 1, the server and the client need to be configured with the same first identifier, e.g. first identifier 0101. And the server and the client also need to be configured with the same second identifier, e.g. second identifier 1010.

Figure 3A:
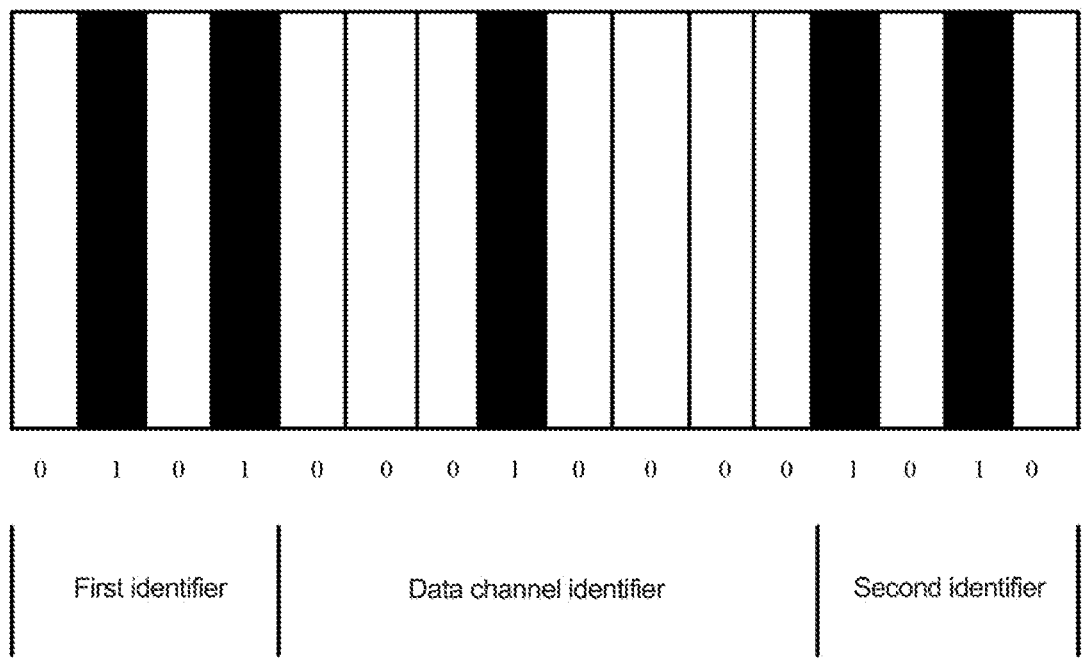
FIGS. 3A-3C are schematic diagrams of application scenarios according to an example of the present disclosure.

After acquiring the data channel identifier (e.g. 00010000), the server may add the first identifier 0101 before the data channel identifier and the second identifier 1010 behind the data channel identifier, and then organize the first identifier, the data channel identifier and the second identifier to form a numeric character string which may be 0101000100001010. Thereafter, the numeric character string may be converted into a data channel identifier image of an image format by an image conversion technology. This data channel identifier image is the above image identification code. No limitation is made to the image conversion technology. Any methods capable of converting numeric character strings into images are encompassed by the scope of protection of the present disclosure. As shown in FIG. 3A, which is an example of image identification code, in this image identification code, 0 is represented by the white pattern, and 1 is represented by the black pattern. To achieve this, for the pixel points in number 0, the gray value of these pixel points may be set to be 255, and for the pixel points in number 1, the gray value of these pixel points may be set to be 0. For example, in FIG. 3A, assuming the playing window occupies 320 pixel points, as the numeric character string 0101000100001010 has 16 bits, then each bit occupies 20 pixel points, namely, pixel point 1 to pixel point 20 have a gray value of 255 corresponding to the first bit 0 in the numeric character string, and pixel point 21 to pixel point 40 have a gray value of 0 corresponding to the second bit 1 in the numeric character string. By analogy, the numeric character string is converted into a data channel identifier image of an image format.

After acquiring the image identification code, the client finds, based on the first identifier 0101 and starting from the left of the image identification code, the consecutive pixel points corresponding to the first 0 of the first identifier, i.e. the consecutive pixel points with a gray value of 255. Since pixel point 1 to pixel point 20 have a gray value of 255, it determines the pixel point 1 to the pixel 20 as the pixel points corresponding to the first 0 of the first identifier. Then it finds the consecutive pixel points corresponding to the first 1 of the first identifier, i.e. the consecutive pixel points with a gray value of 0. Since pixel point 21 to pixel point 40 have a gray value of 0, it determines the pixel point 21 to the pixel point 40 as the pixel points corresponding to the first 1 of the first identifier. By analogy, it determines the various pixel points corresponding to the first identifier.

From the above, the client can learn that every 20 pixel points are corresponding to one number in the numeric character string. Then, starting from the left of the image identification code, the client can convert the image identification code into a numeric character string by an image identification technology. For example, it converts 20 consecutive pixel points with a gray value of 255 into number 0 and converts 20 consecutive pixel points with a gray value of 0 into number 1. For example, in the case of the image identification code shown in FIG. 3A, it may convert it into a numeric character string 0101000100001010, parse out from the numeric character string the first character string matching with the first identifier 010 and the second character string matching with the second identifier 1010, and determine the character string 00010000 between the first character string and the second character string as the data channel identifier.

Figure 3B:
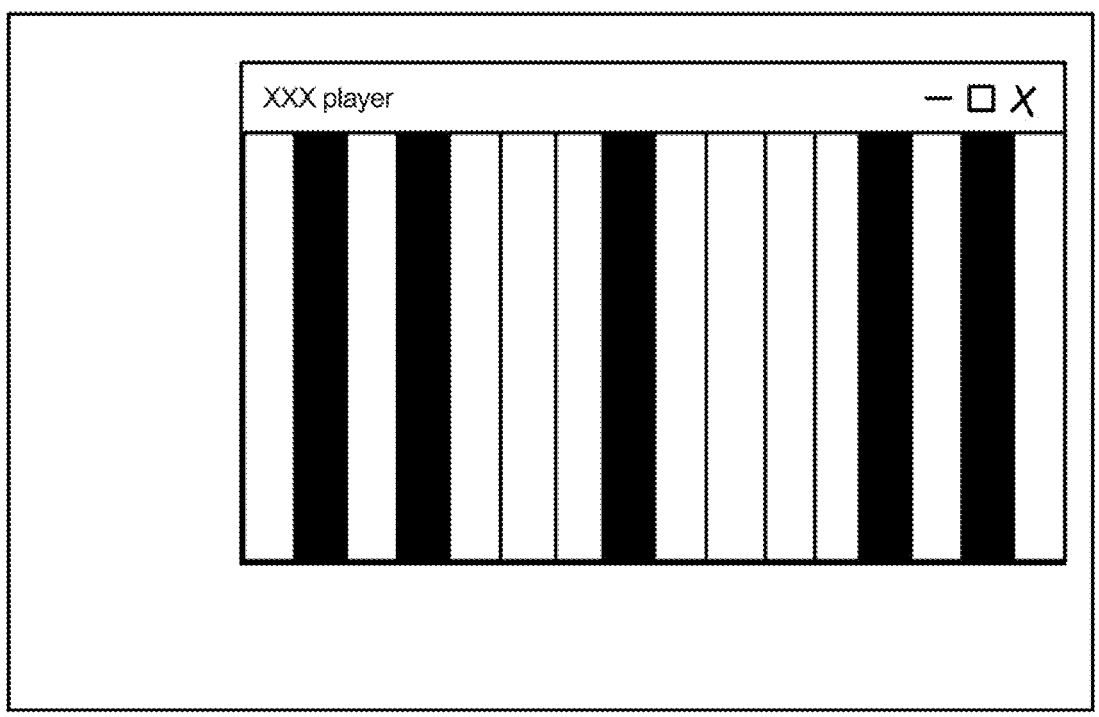

In an example, in the process of generating playing-window filling data based on the player information, the playing window information and the data channel identifier, after generating the image identification code as shown in FIG. 3A, the server may add this identification code to the corresponding playing window, i.e. display this image identification code in the playing window, as shown in FIG. 3B. Then, the server may generate playing-window filling data according to the interface as shown in FIG. 3B. The playing-window filling data may include the player information and the image identification code.

After receiving the playing-window filling data, the client may parse out the player information and the image identification code from the playing-window filling data and the client may display the image identification code on the player interface (i.e. the player interface corresponding to the player information), as shown in FIG. 3B. The client may determine the playing window information according to the area where the image identification code is displayed. That is to say, the area where the image identification code is displayed is the playing window corresponding to the playing window information. Then, the client may determine the data channel identifier as 00010000. At this point, the client has acquired the player information, the playing window information and the data channel identifier.

Regarding Manner 2, it has the processes similar to those of Manner 1. The differences between them will be described below.

Figure 3C:
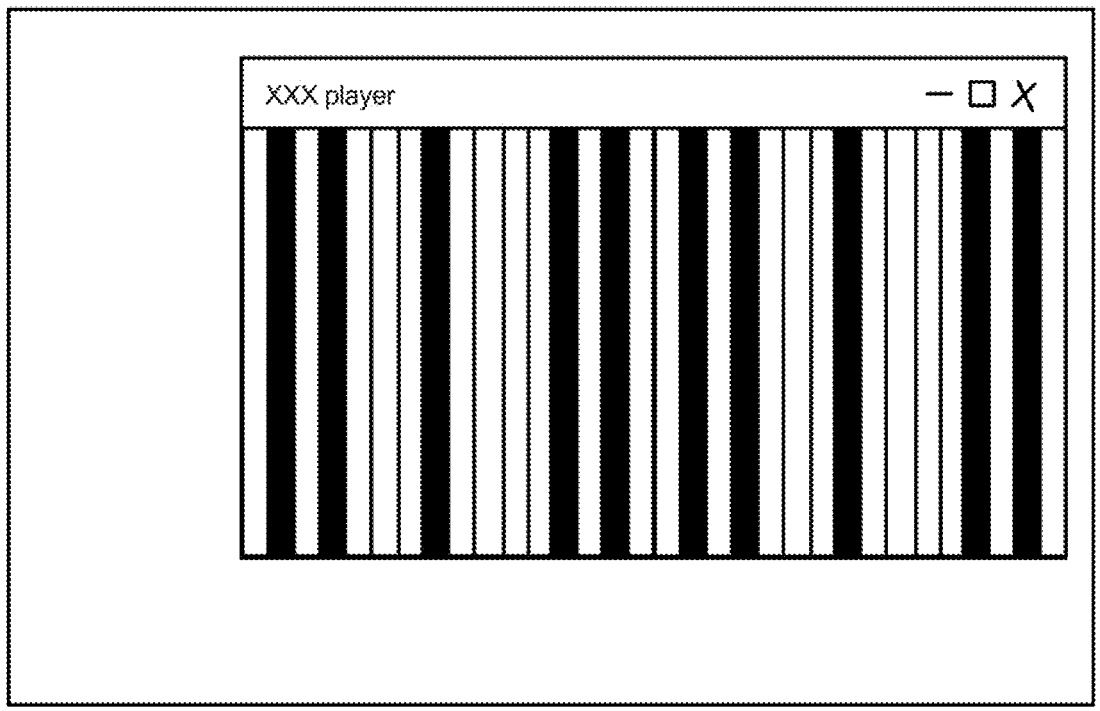

In Manner 1, the image identification code consists of one data channel identifier image, whereas in Manner 2, the image identification code consists of two data channel identifier images which are bilaterally symmetrical, as shown in FIG. 3C, which is a schematic diagram of an image identification code consisting of two data channel identifier images which are bilaterally symmetrical.

In Manner 1, the client identifies the image from the left of the image identification code, whereas in Manner 2, the client identifies the image from the center of the image identification code. For example, in the schematic diagram of an image identification code shown in FIG. 3C, based on the first identifier 0101 locally configured, the client, starting from the center of the image identification code, finds the number of consecutive pixel points corresponding to the first 0 in the first identifier, and so on.

Further, Manner 2 provides the following effect. As the image identification code includes two data channel identifier images, by identifying the image from the center of the image identification code, it allows accurately finding the consecutive pixel points corresponding to the first 0 in the first identifier 0101 and thus accurately identifying the image identification code.

Block 205, in which the client locally displays the player interface corresponding to the player information.

Block 206, in which the client determines the playing window corresponding to the playing window information based on the player interface.

Block 207, in which the client displays the video data corresponding to the data channel identifier in the playing window.

In an example, the client may locally display the player interface corresponding to the player information, as shown in FIG. 3B, which is an example of a player interface. The playing window corresponding to the playing window information is determined based on the player interface, i.e. the area where the image identification code is displayed, as shown in FIG. 3B. Then, the video data corresponding to the data channel identifier may be displayed in the playing window. Assuming the video data corresponding to the data channel identifier is that as shown in FIG. 1B, the video data finally displayed on the player interface would be like that shown in FIG. 1J.

According to the above technical solution, in the present disclosure, the server sends playing-window filling data to the client, and the client may determine the player information, the playing window information and the data channel identifier based on the playing-window filling data, display by the client the player interface corresponding to the player information, determine the playing window corresponding to the playing window information based on the player interface, and display the video data corresponding to the data channel identifier in the playing window. The above methods can ensure that the player interface synchronizes with the playing window for the video data by solving the problem that the player interface does not synchronize with the playing window for the video data, so that the client may correctly display the video data, e.g. the video data changing with the player location in real time, and the user experience may be improved.

Figure 4:
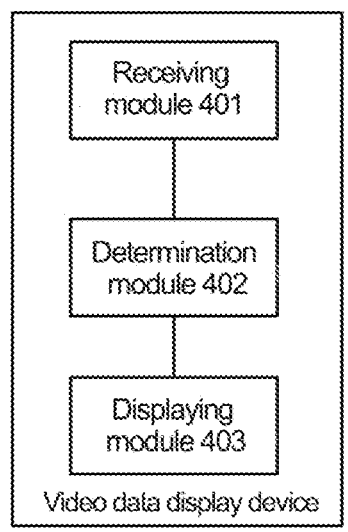
FIG. 4 is a structural diagram of a device of displaying video data according to an example of the present disclosure.

Based on the same concept with the above methods, the embodiments of the present disclosure further propose a device of displaying video data, which is applied to the client for remote display in multimedia redirection. As shown in FIG. 4, which is a structural diagram of the device, the device includes a receiving module 401 which is configured to receive playing-window filling data sent from the server, a determination module 402 which is configured to determine the player information, the playing window information and the data channel identifier based on the playing-window filling data, and a display module 403 which is configured to display by the client the player interface corresponding to the player information. The determination module 402 is further configured to determine the playing window corresponding to the playing window information based on the player interface. The display module 403 is further configured to display the video data corresponding to the data channel identifier in the playing window.

The determination module 402 is specifically configured to, in the process of determining player information, playing window information and data channel identifier based on the playing-window filling data, parse out the player information, the playing window information and the data channel identifier from the playing-window filling data if the playing-window filling data includes the player information, the playing window information and the data channel identifier; or parse out the player information and the image identification code from the playing-window filling data if the playing-window filling data includes the player information and an image identification code and the image identification code includes the data channel identifier, display the image identification code on the player interface corresponding to the player information, determine the playing window information according to the area where the image identification code is displayed, and parse out the data channel identifier from the image identification code.

In an example, the determination module 402 is further configured to, in the process of parsing out the data channel identifier from the image identification code, convert, from the left of the image identification code, the image identification code into a numeric character string by an image identification technology, wherein the image identification code consists of one data channel identifier image; or convert, from the center of the image identification code, the image identification code into a numeric character string by an image identification technology, wherein the image identification code consists of two bilaterally-symmetrical data channel identifier images, with the data channel identifier image being an image corresponding to a numeric character string consisting of a first identifier, a data channel identifier and a second identifier;

and parse out a first character string matching with the first identifier and a second character string matching with the second identifier from the numeric character string obtained by the converting, and determine the character string between the first character string and the second character string, as the data channel identifier.

Figure 5:
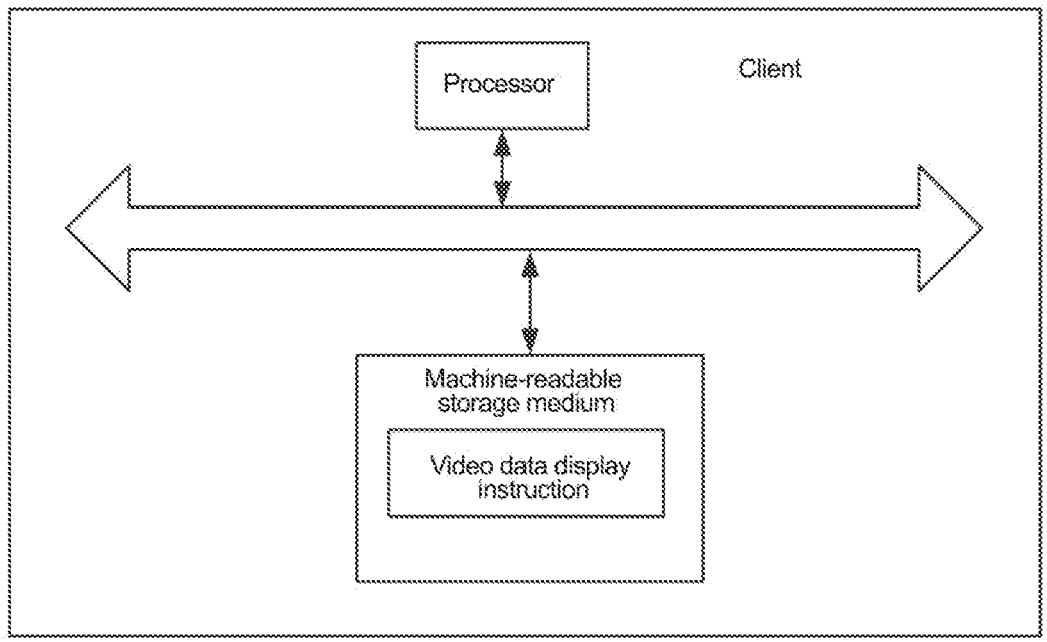
FIG. 5 is a structural diagram of the hardware of a client according to an example of the present disclosure.

The client provided by the embodiments of the present disclosure has, from the hardware level, the hardware architecture, the schematic diagram of which is shown in FIG. 5. It may include a machine-readable storage medium and a processor, in which:

the machine-readable storage medium is configured to store instruction codes; and the processor communicates with the machine-readable storage medium, reads and executes the instruction codes stored in the machine-readable storage medium, and realizes the operation of displaying the video data performed by the client disclosed by the above examples of the present disclosure.

Here, the machine-readable medium may be any electronic, magnetic, optical or other physical storage devices which may contain or store information, such as executable instructions and data. For example, the machine-readable storage medium may be RAM (Random Access Memory), volatile memory, nonvolatile memory, flash memory, memory driver (e.g. hard drive), solid state disk, any type of memory disk (e.g. optical disk and dvd), or similar storage media or the combination thereof.

The processor in the client may be an integrated circuit chip capable of processing data. The processor may be a general purpose processor, e.g. Central Processing Unit (CPU), Network Processor (NP) and so on. It is capable of implementing or executing the methods, steps and logic diagrams at the client side in the present disclosure. General purpose processor may be microprocessor or the processor may be any conventional processor or the like.

Figure 6:
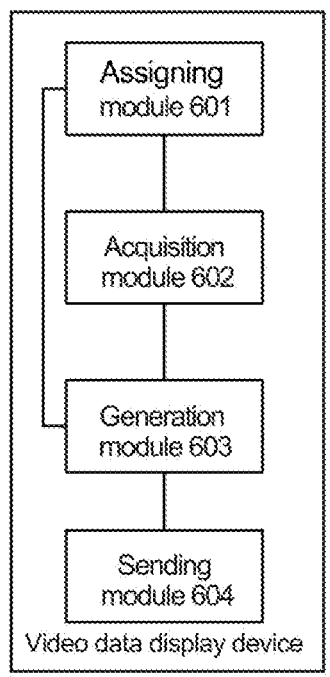
FIG. 6 is a structural diagram of a device of displaying video data according to another example of the present disclosure.

Based on the same concept with the above method, the embodiments of the present disclosure further propose a device of displaying video data, which is applied to the server in multimedia redirection. The server can simulate a virtual player interface for remote display. As shown in FIG. 6, which is a structural diagram of the device, the device includes an assigning module 601 which is configured to assign a data channel for video data to the client, the video data being sent to the client via the data channel and the data channel being uniquely determined by a data channel identifier, an acquisition module 602 which is configured to acquire the player information and the playing window information of the player for playing the video data, a generation module 603 which is configured to generate playing-window filling data based on the player information, the playing window information and the data channel identifier, and a sending module 604 which is configured to send the playing-window filling data to the client so that the client may display the video data based on the player information, the playing window information and the data channel identifier.

The generation module 603 is specifically configured to generate an image identification code including the data channel identifier, in the process of generating playing-window filling data based on the player information, the playing window information and the data channel identifier, display the image identification code based on the playing window information, and then generate playing-window filling data based on the interface where the image identification code is displayed, with the playing-window filling data including the player information and the image identification code; or generate playing-window filling data carrying the player information, the playing window information and the data channel identifier.

The generation module 603 is further configured to, in the process of generating an image identification code including the data channel identifier, add a first identifier before the data channel identifier and a second identifier behind the data channel identifier, organize the first identifier, the data channel identifier and the second identifier to form a numeric character string, and convert the numeric character string into a data channel identifier image of an image format by an image conversion technology; and generate an image identification code using the data channel identifier image, with the image identification code consisting of one data channel identifier image or two data channel identifier images which are bilaterally symmetrical.

The generation module 603 is specifically configured to, in the process of generating playing-window filling data based on the player information, the playing window information and the data channel identifier, generate playing-window filling data based on the playing information, the playing window information and the data channel identifier when detecting change in the playing window information corresponding to the video data.

The acquisition module 602 is further configured to receive operation information regarding operations that a user performs on the player interface with the operation information sent from the client, and learn that there is a change in the dimensions and/or coordinates of the virtual player interface corresponding to the player interface upon receiving such operation information. The generation module 603 is further configured to regenerate playing-window filling data based on the data channel identifier for assigning a data channel for the video data to the client, the changed player information and playing window information. The sending module 604 is further configured to send the regenerated playing-window filling data to the client.

Figure 7:
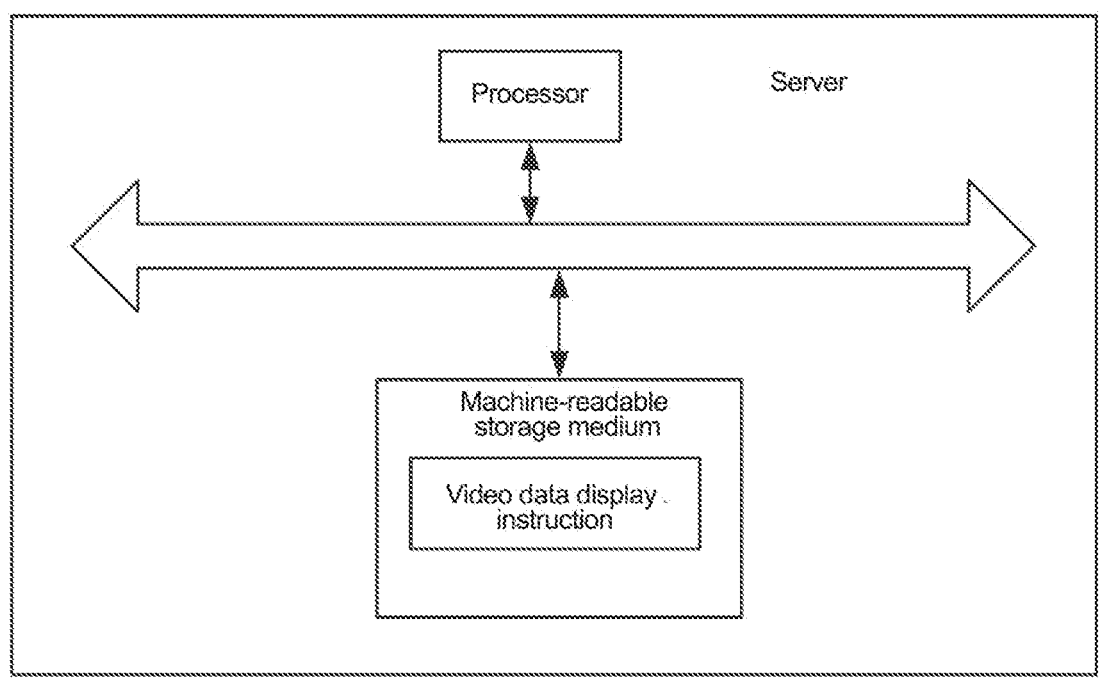
FIG. 7 is a structural diagram of the hardware of a server according to an example of the present disclosure.

The server provided by the embodiments of the present disclosure has, from the hardware level, the hardware architecture, the schematic diagram of which is shown in FIG. 7. It may include a machine-readable storage medium and a processor, in which:

the machine-readable storage medium is configured to store instruction codes; and the processor communicates with the machine-readable storage medium, reads and executes the instruction codes stored in the machine-readable storage medium, and realizes the operation of displaying the video data performed by the server disclosed by the above examples of the present disclosure.

Here, the machine-readable medium may be any electronic, magnetic, optical or other physical storage devices which may contain or store information, such as executable instructions and data. For example, the machine-readable storage medium may be RAM (Random Access Memory), volatile memory, nonvolatile memory, flash memory, memory driver (e.g. hard drive), solid state disk, any type of memory disk (e.g. optical disk and dvd), or similar storage media or the combination thereof.

The processor in the server may be an integrated circuit chip capable of processing data. The processor may be a general purpose processor, e.g. Central Processing Unit (CPU), Network Processor (NP) and so on. It is capable of implementing or executing the methods, steps and logic diagrams at the server side in the present disclosure. General purpose processor may be microprocessor or the processor may be any conventional processor or the like.

The systems, devices, modules or units illustrated in the above embodiments may be specifically implemented by a computer chip or an entity, or a product with a certain function. Typical implementing equipment is computer which may specifically be in a form of personal computer, laptop, cellular phone, camera phone, smart phone, personal digital assistant, media player, navigation equipment, e-mail transceiver, game console, tablet computer, wearable device, or the combination of several of them.

Those skilled in the art should understand that the embodiments of the present disclosure may provide methods, systems or computer program products. Hence, the present disclosure may be implemented in full hardware embodiments, full software embodiments or combined hardware and software embodiments. In addition, the present disclosure may be realized by a computer program product implemented on one or more computer-usable storage media (including but not limited to magnetic disk memory, CD-ROM, optical memory, etc.) containing computer-usable program codes.

The present disclosure is described with reference to flowcharts and/or block diagrams of methods, apparatuses (systems) and computer program products according to embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus, such that the functions specified in the flowchart flow or flows and/or block diagram block or blocks are implemented through the instructions executed by the processor of the computer or other programmable data processing apparatus.

Furthermore, these computer program instructions may also be stored in a computer-readable memory that can direct a computer or other programmable data processing apparatus to operate in a particular manner, such that the instructions stored in the computer-readable memory form instruction means which implement the functions specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the functions specified in the flowchart flow or flows and/or block diagram block or blocks are implemented through the instructions executed on the computer or other programmable apparatus.

The above description only shows the embodiments of the present disclosure and does not limit the present disclosure. For those skilled in the art, various changes and modifications can be made to the present disclosure. Any modifications, equivalent replacements and improvements made within the spirit and principle of the present disclosure shall be encompassed by the scope of the claims of the present disclosure.

INDUSTRIAL APPLICABILITY

The method and device of displaying video data provided by the embodiments of the present disclosure ensure that the player interface synchronizes with the playing window for video data by solving the problem that the player interface does not synchronize with the playing window for video data, so that the client may correctly display the video data, e.g. the video data changing with the player location in real time, and thereby, the display performance and the user experience are improved.

The invention claimed is:

1. A method for displaying video data, applicable to a client for remote display in multimedia redirection, comprising:
   receiving video data and playing-window filling data sent from a server, the playing-window filling data comprising player interface position and dimension, playing window information and a data channel identifier;
   displaying, by the client, a player interface corresponding to the player interface position and dimension;
   determining, based on the player interface, a playing window corresponding to the playing window information;
   displaying video data corresponding to the data channel identifier in the playing window;
   sending, to the server, operation information regarding an operation a user performs on the player interface that changes position and dimension of the player interface to the client;
   receiving playing-window filling data regenerated by the server based on changed position and dimension, the playing-window filling data indicates an area where the video data is to be displayed on the client, the area corresponding to changed position and dimension of the player interface; and
   displaying the video data in the area.

2. The method according to claim 1, wherein the player interface position and dimension, playing window information and data channel identifier are obtained by:
   parsing out the player interface position and dimension, the playing window information and the data channel identifier from the playing-window filling data; or,
   if the playing-window filling data comprises the player interface position and dimension and an image identification code comprising the data channel identifier, parsing out the player information and the image identification code from the playing-window filling data, displaying the image identification code in the player interface corresponding to the player interface position and dimension, determining the playing window information based on an area where the image identification code is displayed, and parsing out the data channel identifier from the image identification code.

3. The method according to claim 2, wherein parsing out the data channel identifier from the image identification code comprises:

converting, starting from left of the image identification code, the image identification code into a numeric character string by an image identification technology, wherein the image identification code consists of one data channel identifier image; or converting, starting from a center of the image identification code, the image identification code into a numeric character string by the image identification technology, wherein the image identification code consists of two data channel identifier images which are bilaterally symmetrical, wherein the data channel identifier image is an image corresponding to a numeric character string consisting of a first identifier, a data channel identifier and a second identifier; and parsing out a first character string matching with the first identifier and a second character string matching with the second identifier from the numeric character string obtained by the converting, and determining a character string between the first character string and the second character string as the data channel identifier.

4. A method for displaying video data, applicable to a server for remote display in multimedia redirection, comprising:

assigning a data channel for video data to a client, wherein the video data is sent to the client via the data channel and the data channel is uniquely determined by a data channel identifier;

acquiring player interface position and dimension and playing window information of a player for playing the video data;

generating playing-window filling data based on the player interface position and dimension, the playing window information and the data channel identifier;

sending the playing-window filling data to the client so that the client displays the video data based on the player interface position and dimension, the playing window information and the data channel identifier;

receiving operation information regarding an operation a user performs on the player interface that changes the player interface position and dimension on the client; and regenerating playing window filling data based on changed player interface position and dimension and sending the regenerated playing-window filling data to the client, the regenerated playing-window filling data indicates an area where the video data is to be displayed on the client, the area corresponding to changed player interface position and dimension.

5. The method according to claim 4, wherein generating playing-window filling data based on the player information, the playing window information and the data channel identifier comprises:

generating an image identification code comprising the data channel identifier, and displaying the image identification code according to the playing window information; generating playing-window filling data according to an interface where the image identification code is displayed, wherein the playing-window filling data comprises the player information and the image identification code; or generating playing-window filling data carrying the player information, the playing window information and the data channel identifier.

6. The method according to claim 5, wherein generating an image identification code comprising the data channel identifier comprises:

adding a first identifier before the data channel identifier and a second identifier behind the data channel identifier, organizing the first identifier, the data channel identifier and the second identifier to form a numeric character string, and converting the numeric character string into a data channel identifier image of an image format by an image conversion technology; and generating an image identification code using the data channel identifier image, wherein the image identification code consists of one data channel identifier image, or consists of two data channel identifier images which are bilaterally symmetrical.

7. The method according to claim 4, wherein generating playing-window filling data based on the player information, the playing window information and the data channel identifier comprises:

generating playing-window filling data based on the player information, the playing window information and the data channel identifier when detecting a change in the playing window information corresponding to the video data.

8. The method according to claim 4, wherein the playing-window filling data is carried by a remote desktop protocol message and sent to the client via a remote desktop protocol.

9. A device for displaying video data, applicable to a server for remote display in multimedia redirection, comprising:

an assigning module, which is configured to assign a data channel for video data to a client, wherein the video data is sent to the client via the data channel and the data channel is uniquely determined by a data channel identifier;

an acquisition module, which is configured to acquire player interface position and dimension and playing window information of a player for playing the video data;

a generation module, which is configured to generate playing-window filling data based on the player interface position and dimension, the playing window information and the data channel identifier; and a sending module, which is configured to send the playing-window filling data to the client, so that the client displays the video data based on the player interface position and dimension, the playing window information and the data channel identifier;

wherein the acquisition module is further configured to receive operation information regarding an operation a user performs on the player interface that changes the player interface position and dimension on the client; and regenerate playing window filling data based on changed player interface position and dimension and sending the regenerated playing-window filling data to the client, the regenerated playing-window filling data indicates an area where the video data is to be displayed on the client, the area corresponding to changed player interface position and dimension.

10. The device according to claim 9, wherein the generation module is configured to generate an image identification code comprising the data channel identifier, in a process of generating playing-window filling data based on the player information, the playing window information and the data channel identifier, and display the image identification code based on the playing window information; and generate playing-window filling data based on an interface where the image identification code is displayed, wherein the playing-window filling data comprises the player information and the image identification code; or generate playing-window filling data carrying the player information, the playing window information and the data channel identifier.

11. The device according to claim 10, wherein the generation module is further configured to, in the process of generating an image identification code comprising the data channel identifier, add a first identifier before the data channel identifier and a second identifier behind the data channel identifier, organize the first identifier, the data channel identifier and the second identifier to form a numeric character string, and convert the numeric character string into a data channel identifier image of an image format by an image conversion technology; and generate an image identification code using the data channel identifier image, wherein the image identification code consists of one data channel identifier image, or consists of two data channel identifier images which are bilaterally symmetrical.

12. The device according to claim 9, wherein the generation module is configured to generate playing-window filling data based on the playing information, the playing window information and the data channel identifier, when detecting a change in the playing window information corresponding to the video data, in a process of generating playing-window filling data based on the player information, the playing window information and the data channel identifier.

* * * * *